(12) United States Patent
Jacquet et al.

(10) Patent No.: US 7,272,775 B2
(45) Date of Patent: Sep. 18, 2007

(54) MEMORY CIRCUIT COMPRISING AN ERROR CORRECTING CODE

(75) Inventors: Francois Jacquet, Froges (FR); Jean-Pierre Schoellkopf, Grenoble (FR)

(73) Assignee: STMicroelectronics SA, Montrouge (FR)

( * ) Notice: Subject to any disclaimer, the term of this patent is extended or adjusted under 35 U.S.C. 154(b) by 368 days.

(21) Appl. No.: 10/453,844

(22) Filed: Jun. 3, 2003

(65) Prior Publication Data
US 2004/0044943 A1    Mar. 4, 2004

(30) Foreign Application Priority Data
Jun. 3, 2002   (FR) ................................... 02 06794

(51) Int. Cl.
*G11C 29/42* (2006.01)
(52) U.S. Cl. ................ 714/766; 714/763; 714/773
(58) Field of Classification Search ...............................
G11C 29/00, 29/42
See application file for complete search history.

(56) References Cited

U.S. PATENT DOCUMENTS

| 4,604,750 A | 8/1986 | Manton et al. ............. 714/764 |
| 6,065,146 A | 5/2000 | Bosshart ..................... 714/773 |
| 2003/0188251 A1* | 10/2003 | Brown et al. ............... 714/763 |

* cited by examiner

*Primary Examiner*—R. Stephen Dildine
(74) *Attorney, Agent, or Firm*—Lisa K. Jorgenson; Jose Gutman; Fleit Kain Gibbons Gutman Bongini & Bianco P.L.

(57) ABSTRACT

A memory circuit with an error correcting system comprising an address bus (102), an input data bus (108), and an output data bus (115), the circuit comprising a memory having an address bus (113), a data bus (114) and an error correcting circuit comprising an encoder (107). A first address register (104) is connected to the input address bus of the circuit for successively storing addresses corresponding to memory write operations only. A second data register (105) is connected to the input data bus of the circuit (108) for storing data transmitted to the encoder (107). Circuits make it possible to introduce a one-cycle shift into the memory writes, without modifying reads, giving the encoder more time to compute error correcting codes.

21 Claims, 7 Drawing Sheets

MEMORY CIRCUIT COMPRISING AN ERROR CORRECTING CODE

CROSS-REFERENCE TO RELATED APPLICATION

This application is based upon and claims priority from prior French Patent Application No. 02 06794, filed on Jun. 3, 2002, the entire disclosure of which is herein incorporated by reference.

BACKGROUND OF THE INVENTION

1. Field of the Invention

The present invention relates to memory circuits, and in particular to a memory circuit equipped with an error correcting code system.

2. Description of the Related Art

With the continuous growth of their computing power and the rise of their operation frequency, the sensitivity of information processing systems to errors likely to corrupt data considerably increases. This is all the more sensitive since miniaturization of electronic components reduces the size of the electronic components contained in Very Large Systems Integration (V.L.S.I.) circuits and in particular the size of Read Access Memory (R.A.M) circuits integrated therein.

Thus, it can be noted that static storages whose load capacities are increasingly lower with the development of technologies, become particularly sensitive to electromagnetic fields and disturbances, which obviously is an important source of errors disturbing correct operation of electronic circuits.

Memory systems are conventionally protected against fugitive or random errors by being equipped with error correcting systems based on error correcting codes or ECC. As is known, redundant information—in the form of an ECC code—is introduced so that information integrity can be checked by computation upon fetching or even that one or more erroneous bits can be restored.

FIG. 1 illustrates a conventional architecture of a memory circuit equipped with such an error correcting system. Via an input bus 2 (for example, a 32-bit bus) data is sent to a static RAM 1, and to an encoder 4 that computes an error correcting code and then data and the error correcting code are stored in memory 1. Upon a read operation, a decoder again computes the error correcting code so that a comparator 6 compares the expected code with the code actually stored in memory. Any difference is then interpreted as an error and, according to the code used, one or more errors can be detected or corrected.

In general, the use of an error correcting code in a memory circuit is satisfactory and in particular in sensitive systems, such as telecommunication servers and routers. However, it is noted that the use of such a system usually penalizes the system's operating speed. Indeed, if one considers for example a circuit having an operation frequency of 200 MHz, this leaves 5 nanoseconds—i.e. very little time—to insert the computing time required by encoder 4.

Thus memory circuits functioning at high speed are not adapted to use an error correcting code, which is very regrettable since nowadays many applications are used for which operating speed goes hand in hand with data integrity and security.

Accordingly, there exists a need for overcoming the disadvantages of the prior art as discussed above.

SUMMARY OF THE INVENTION

A main advantage of the present invention is in realizing a memory circuit architecture that is particularly adapted to high speeds while allowing the integration of an error correcting code system.

A first aspect of the present invention provides a memory architecture adapted to use an error correcting code allowing high operating frequency.

Another aspect of this invention provides a high performance memory circuit equipped with an error correcting system.

A preferred embodiment of the invention provides advantages by means of a memory circuit equipped with an error correcting system comprising an address bus, an input data bus, and an output data bus. The circuit comprises a memory that includes its own address bus, its own input data bus and own output data bus, and an error correcting circuit comprising an ECC encoder. The circuit comprises an address shift unit (or address pipeline stage) making it possible to shift write operations in a given cycle to the next write cycle. Read operations remain unchanged.

As a result the encoder has enough time to compute the error correcting code that can be stored during the next write operation, along with corresponding data. While this data is stored, the following data to record is in turn placed in the pipeline stage in order to allow computation of the next error correcting code.

More precisely, a first address register connected to the address input bus of the memory circuit makes it possible to successively store addresses corresponding only to write operations in the memory. A second data register connected to input data bus of the circuit stores data transmitted to the encoder. Multiplexer circuits introduce a one-cycle shift into writes in the memory, without modifying reads, permitting a longer computing time for the encoder.

Thus, it is possible to increase memory frequency while maintaining computation of error correcting code.

Preferably, the memory circuit comprises a single memory with single port having an address bus, an input data bus and an output data bus. A first multiplexer has a first input connected to the input address bus of the circuit, a second input connected to the output of the first address register, and an output connected to the address bus of the memory. The first multiplexer is controlled by a write enable signal (WEN).

In a preferred embodiment, the circuit further comprises:
 a comparator having two inputs connected to the input address bus of the circuit and to the output of the first address register, respectively,
 a second multiplexer controlled by the comparator and having a first input connected to the output of the second data register, a second input connected to the data bus of the memory and an output connected to the output bus of the circuit. This ensures correct data value is provided, even when data is waiting to be written.

Preferably, the memory circuit is realized by means of a single memory with a single port wherein data and its associated error correcting code are simultaneously stored.

Alternatively, two distinct memories could be used, where the first memory is organized to receive data and the second one stores error correcting codes.

In an embodiment, the second memory is a double port memory, allowing simultaneous writing and reading in the memory.

Alternatively, the second memory could be a single port memory and will be equipped with a decoder circuit allowing to detect an error in the first memory, and a set of multiplexers for placing a write operation in the first memory within the next cycle, in response to the decoder circuit detecting an error.

BRIEF DESCRIPTION OF THE DRAWING

Other features, objects and advantages of the present invention will become apparent when reading the following description and drawings, only given by way of nonrestrictive examples, wherein.

DESCRIPTION OF THE PREFERRED EMBODIMENTS

Figure 1:
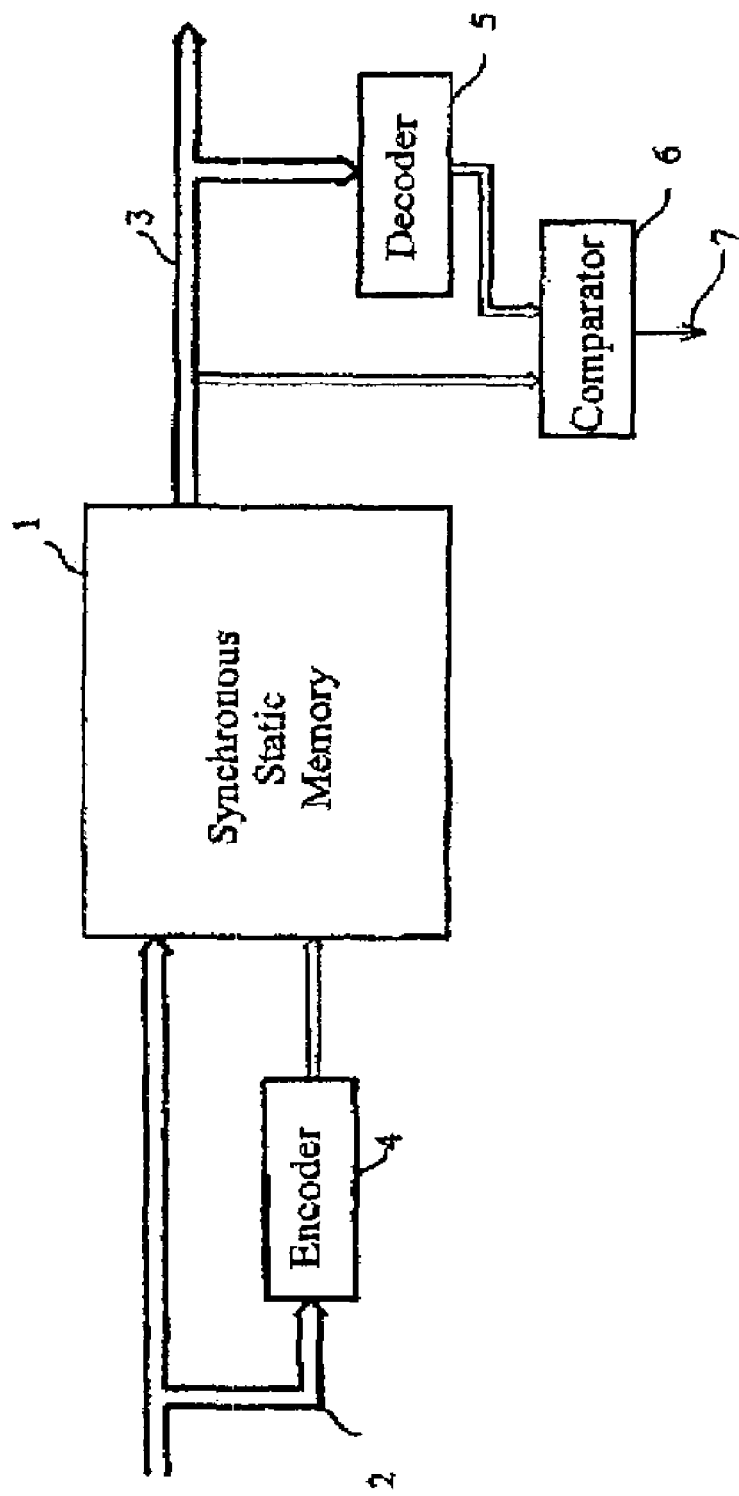
FIG. 1 illustrates a conventional architecture of a memory circuit comprising an error correcting code.
Figure 2:
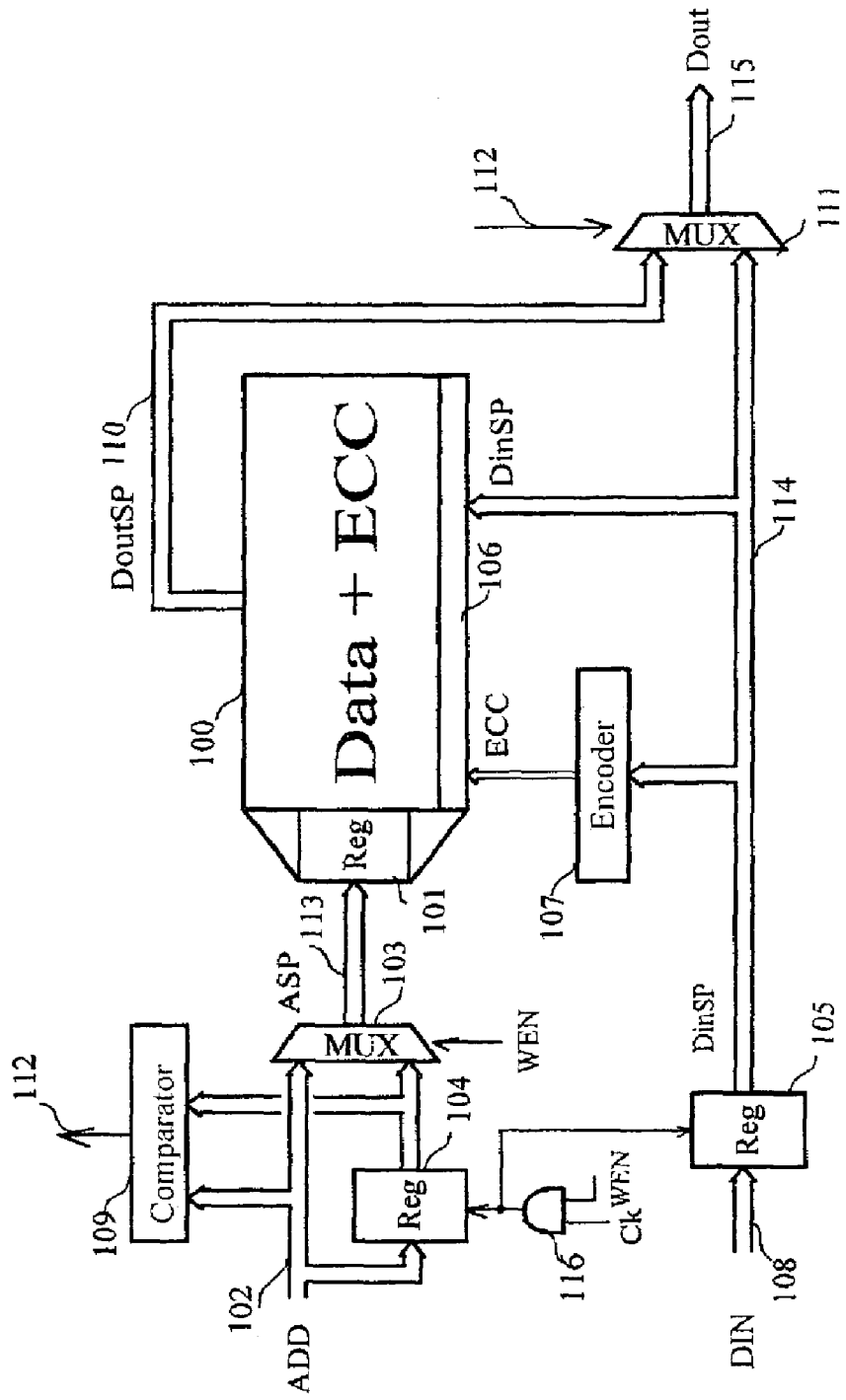
FIG. 2 illustrates a high-speed memory circuit according to a first embodiment of the invention for a single port memory recording data and error correcting codes.

FIG. 2 illustrates a preferred embodiment of a high-speed memory circuit equipped with an error correcting system. It will be assumed that the memory circuit is based on a synchronous static memory, which, as is known in the art, is particularly sensitive to electromagnetic interferences. However, it will be observed that people qualified in the art could readily adapt the following description to other embodiments, using other types of memory such as dynamic and asynchronous memories. The particular case of an error correcting code of adapted SEC-DED-type adding 7 redundancy bits to 32 bits of elementary information could also be considered. People qualified in the art could readily adapt the invention to other error correcting codes, Double Error Correction, Triple Error Detection (DEC-DED) etc . . . and to realize memory circuits of 64 bits, 128 bits etc . . .

The circuit of FIG. 2 has a data bus 108 for receiving data (DIN) to store in a RAM 100 and one address bus 102 for receiving memory addresses (ADD) in the memory. Output data (Dout) are delivered on an output bus 115. RAM 100 is a single port memory and comprises an internal address register 101 and an internal data register 106. The circuit further comprises a pipeline stage made up of a first register—address register 104—having an input connected to address bus 102 (ADD), and a second register —data register 105—having an input connected to data bus 108. Address register 104 has an output connected to a first input of an address multiplexer 103 whose second input is also connected to bus 102. Address multiplexer 103 is controlled by a write enable signal (WEN) and has an output (ASP) connected to the input of address register 101 of RAM 100 via a bus 113. Register 105 has an output (DinSP) that is connected to a bus 114, which is connected to the input of an encoder 107, to the input of data register 106 of RAM 100 and to a first input of an output multiplexer 111, respectively. Encoder 107 has an output that is also connected to the input of register 106 for completing the first part of information as stored in this register and delivered by bus 114. Consequently register 106 stores a word and its associated error correcting code.

Multiplexer 111 has a second input connected to bus 110 carrying memory 100 output data DoutSP, and an output connected to output bus 115.

Data register 105 and address register 104 are controlled by a control signal generated by an AND gate 116 having two inputs that receive a clock signal CK and the write enable signal WEN, respectively.

A comparator 109 has two inputs connected to address bus 102 and output bus of register 104, respectively, and provides a control signal that is transmitted to multiplexer 111 via a circuit 112.

Registers 104 and 105 store current values carried by buses 102 and 108 only for write operations, and not for read operations. Indeed, as can be seen in FIG. 2, control signal WEN is used to control writes in each of both registers during a write cycle. At the same time, current values that are stored in same registers 104 and 105 are respectively delivered, on the one hand, to the input of address register 101 via multiplexer 103 and bus 113 and, on the other hand, to the input of data register 106 of RAM 100 and to the input of encoder 107. As shown, the pipeline stage comprised of registers 104 and 105 acts as a time barrier that delays the writing of data in memory 100 until the next write cycle. In this manner, data to be stored in RAM and its corresponding address can be redirected while waiting for the next write cycle, which can intervene, in some cases, after several read cycles. Thus, encoder 107 has a time at least equal to an additional cycle to compute the error correcting code to be inserted in register 6, which is particularly advantageous when it is desired to increase memory clock frequency.

In order to prevent, during a read operation, any attempt to access data that is still waiting to be written in data register 105 and address register 104 of the pipeline, comparator 109 continuously compares the address presented on bus 102 with the address waiting to be written in register 104. When equality occurs, which is the case when attempting to access data not yet written in RAM 100, then the comparator generates a control signal on circuit 112. Circuit 112 in turn controls multiplexer 111 to provide the value contained in register 105 instead of the incorrect value DoutSP stored in RAM 100 and carried by bus 110. Thus, it is indeed the correct data temporarily stored in register 105 that is presented on output bus 115 (Dout).

Figure 4:
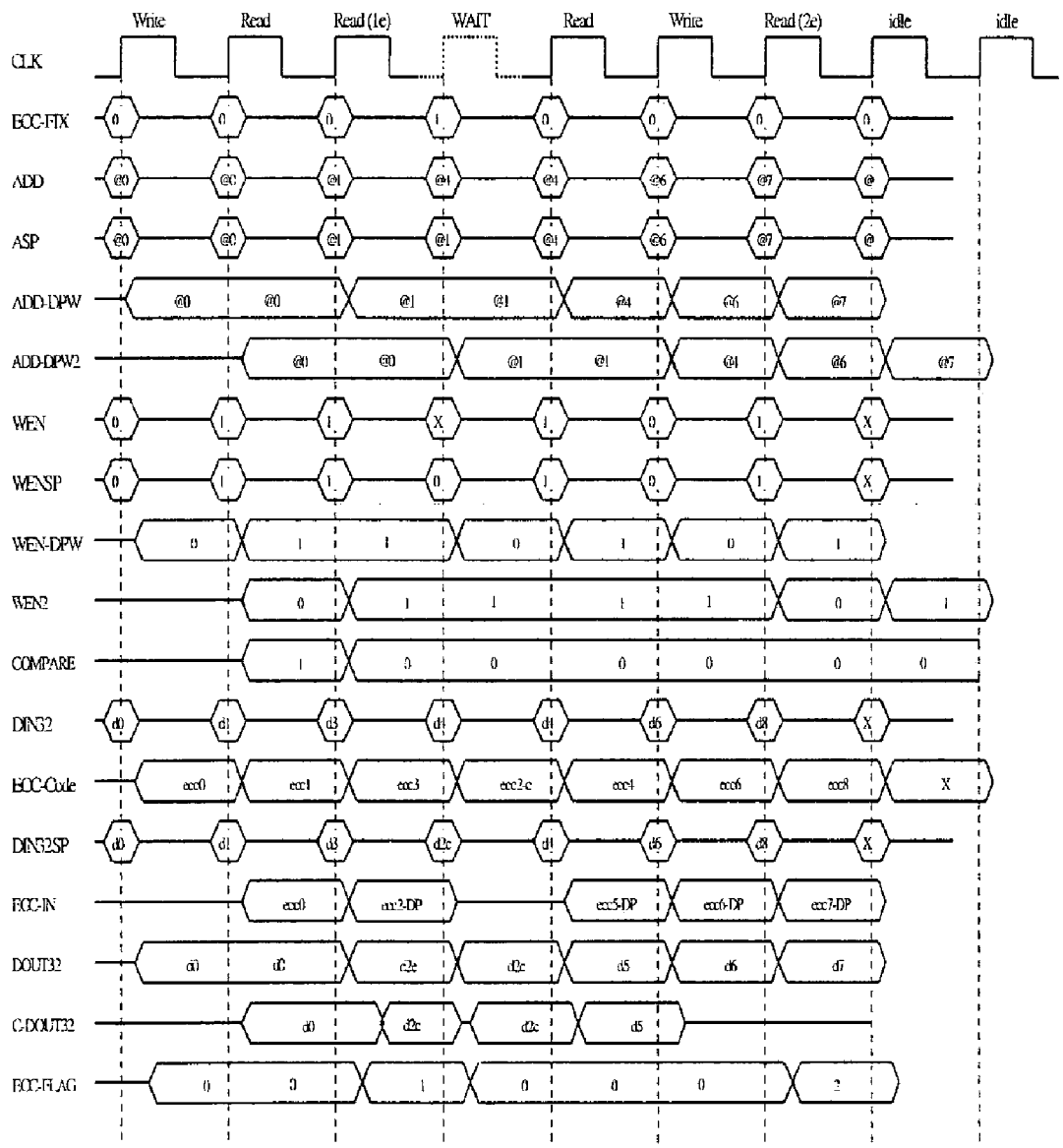
FIG. 4 illustrates chronograms representative of the operation of the second embodiment.

FIG. 4 illustrates chronograms representative of the operation of the circuit of FIG. 2.

Two other embodiments will now be described in order to illustrate general application of the invention. In these two other embodiments, particularly described in detail, two distinct memories are employed for recording data and error correcting code, respectively.

Figure 3:
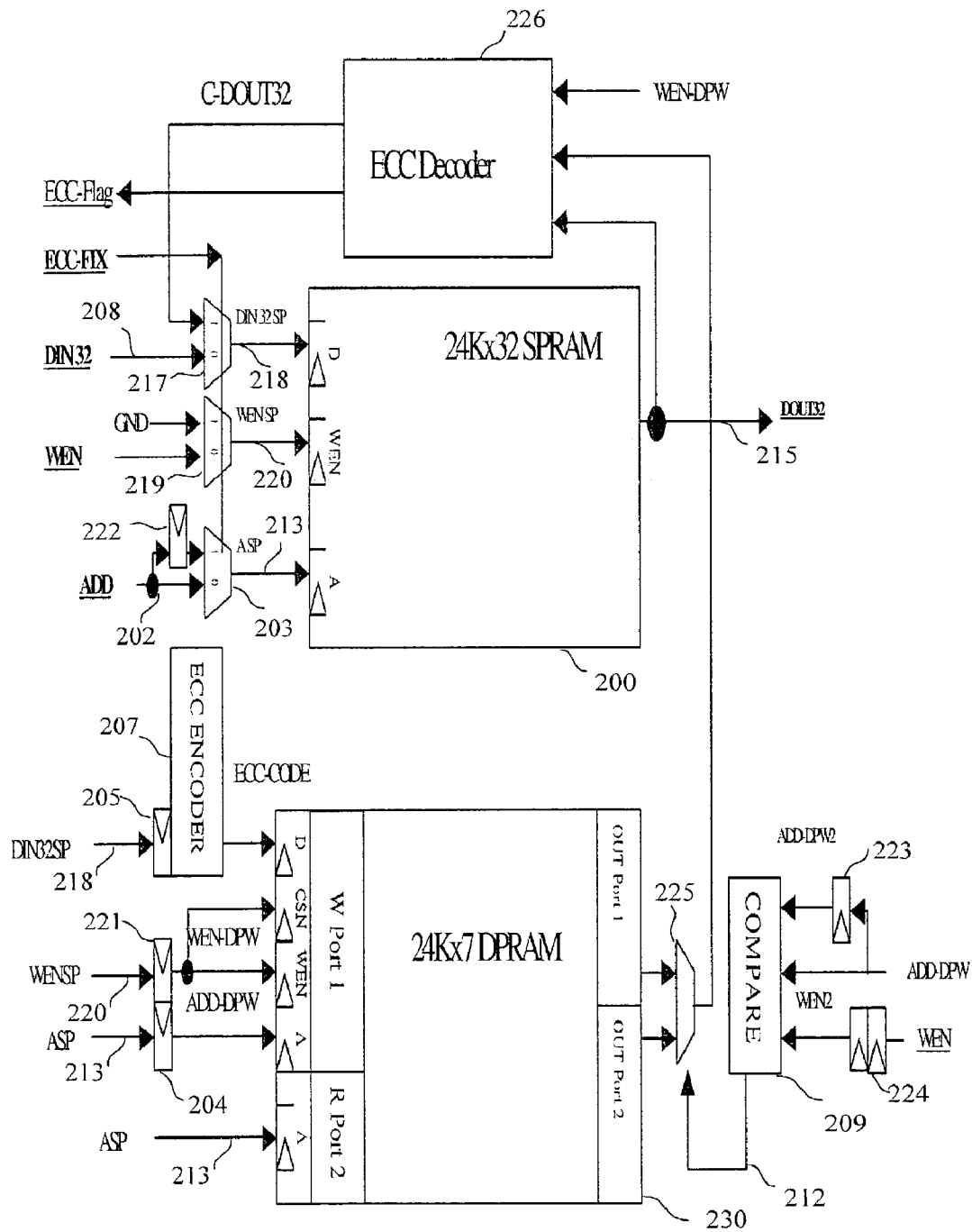
FIG. 3 illustrates a second embodiment based on two distinct memories, one of which is a double port memory.

The second embodiment is illustrated in FIG. 3 and comprises a first single port RAM 200—with a size allowing to store 24K words of 32 bits each, for example—and a second double port memory 230—for example with a size of 24K×7—dedicated to the recording of error correcting codes.

RAM 200 has an address bus (A), a data bus (D) and a control bus comprising in particular the Write Enable signal. Output data Dout32 is available on a bus 215.

Referring now the input bus RAM 200, it can be seen that the data bus (D) of RAM 200 receives information Din32SP from a first multiplexer 217 via a bus 218. Multiplexer 217 has two input buses. A first input of multiplexer 217 receives data to be stored (DIN32) transmitted by a processor (not shown) via a bus 208, and a second input receives information C-Dout32 provided by an EEC-decoder 226. As will be explained later, multiplexer 217 makes it possible to deliver the corrected value computed by circuit 226 to memory 200 where the new corrected value is rewritten. Control WEN of RAM 200 receives a control signal WENSP transmitted via a circuit 220, which signal is generated by a second multiplexer 219 having two inputs: a first input receiving the control signal WEN provided by the processor (not shown) and a second input (GND) that is connected to ground, which makes it possible to place a write cycle in memory 200 as desired, and in particular for correcting an incorrect value stored in memory. The address bus (A) of RAM 200 receives address ASP provided by a third multiplexer 203 via a bus 213, which multiplexer 203 has two input buses: a first bus receiving general address ADD provided by the microprocessor and a second bus connected to the output of an address register 222 whose input also receives general address ADD provided to the memory circuit. Three multiplexers 217, 219 and 203 are controlled by a control signal ECC-FIX, this signal is activated on the cycle that follows detection of an error, in order to rewrite the corrected value.

A double port memory 230 is dedicated to recording of error correcting code provided by an encoder circuit 207 (ECC ENCODER). One of the ports of this memory is dedicated to writing while the other port is dedicated to reading. The port that is dedicated to writing comprises, similarly to circuit in FIG. 2, a set of address register and shift data register for delaying the recording of an error correcting code until the next write cycle. More precisely, it is observed that the first port of memory 230 has a data bus (D) connected on the output of an encoder 207 whose input receives the contents of a data register 205 that is one of the two elements forming the pipeline for shifting memory write operations. Data register 205 receives information Din32SP carried on bus 218 and transmitted by first multiplexer 217. The first port of RAM 230 is dedicated to writing and also comprises an address bus (A) receiving information ADD-DPW stored in a second register 204—similar to register 104 of FIG. 2—whose input receives address ASP provided by multiplexer 203 via bus 213. Finally, the first port of RAM 230 comprises two control signals: a write enable signal (WEN-DPW) and a circuit select signal (Chip Select Negative or CSN). Information WEN-DPW comes from a register 221 that receives the information WENSP output from second multiplexer 219 and transmitted by circuit 220 to input CSN of RAM 230 in the rising edge of the clock signal (not shown), and to the input WEN of this first port.

A second input port of RAM 230 is dedicated to reading and comprises an address bus connected to bus 213 carrying information ASP.

RAM 230 comprises two output ports that are respectively connected to the first and the second inputs of a bus multiplexer 225, whose output is connected to an input of decoder 226, the decoder 226 also receives signal WENDPW. Multiplexer 225 is controlled by a comparator 209, which makes it possible to avoid the conflict situation otherwise arising on any attempt to read the contents of memory 230 at a not yet recorded address. To this end, comparator 209 has a first input connected to the output of register 204 where value ADD-DPW is recorded and a second input connected to the output of a shifting register 223 containing the previous write address. Comparison is carried out on a rising edge of a signal generated from signal WEN via an assembly 224 of two shifting registers.

The operation of the circuit of FIG. 3 is described hereafter.

During a write cycle i, data is recorded in RAM 200 while encoder 207 computes redundancy bits from the value stored in register 205. The result of this computation is stored in memory 230 during the next write cycle i+1, using the pipeline formed by registers 205 and 204.

In reading mode, data is read in RAMs 200 and 230 during a single cycle. Decoder 226 that receives the data available on the output port of RAM 200 computes a syndrome and generates a signal ECC-FLAG in the event of an error, which signal is used to inhibit the next read cycle in order to intercalate a correction cycle by rewriting the correct data C-Dout32 in RAM 200. To this end, a control signal ECC-FIX is transmitted to multiplexers 217, 219 and 203 so that the correct value of data C-DOUT32 is rewritten in memory 200. When a word awaiting a write operation is supposed to be read, comparator 209 detects this situation. Comparator 209 then controls multiplexer 225 to avoid any conflict in RAM 230.

As can be seen, writing of the error correcting code in RAM 230 (WRITE) is delayed until the next write cycle in the RAM memory. If one or more read operations intervene after the data write cycle i in memory 200, the value of the ECC and the storage address remain in registers 205 and 204 respectively, until the next write cycle. Again, as in the circuit of FIG. 2, the time required for encoder circuit 207 to compute the error correcting code is available, even in the event of high frequency operation.

Figure 5:
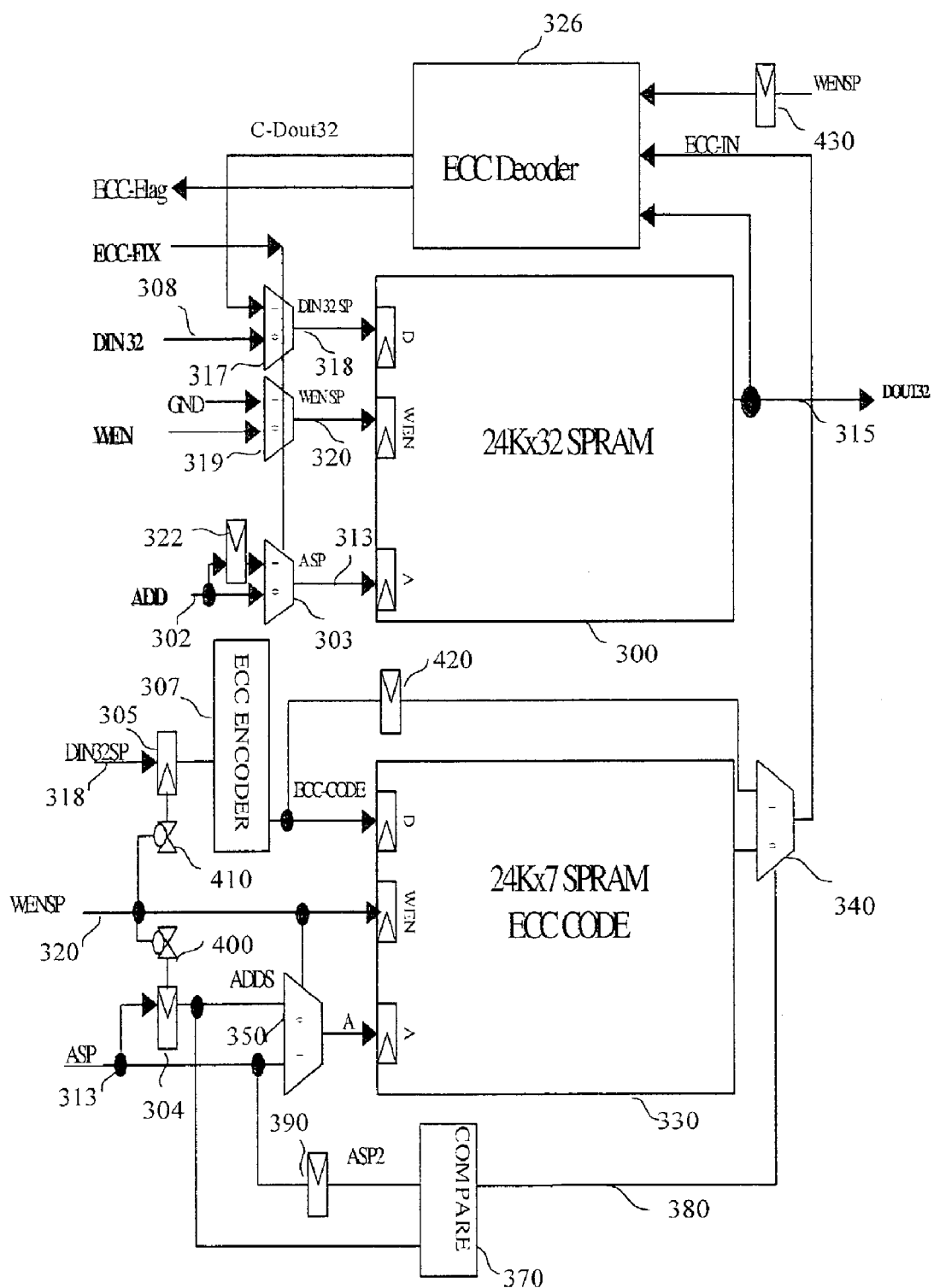
FIG. 5 illustrates a third embodiment based on two single port memories.

Referring to FIG. 5, a third embodiment of a memory circuit will now be described, wherein the double port memory is replaced with a less expensive single port memory.

The circuit comprises a first RAM 300 and a second memory 330, both memories being with single port memories. The first memory is dedicated to data recording while the second one is dedicated to error correcting codes recording.

RAM 300 has a data bus (D) receiving information DIN32SP from a first multiplexer 317 via a bus 318. Multiplexer 317 has two input buses. A first input receives the data to be stored (DIN32) available on a bus 308, while a second input receives information C-Dout32 provided by an EEC-decoder 326 similar to circuit 226 of FIG. 3. As previously, multiplexer 317 makes it possible to deliver the corrected value computed by circuit 326 to the input of memory 200 in order to rewrite the new corrected value in memory. Control WEN of RAM 300 receives a control signal WENSP transmitted via a circuit 320, which signal is generated by a second multiplexer 319 having two inputs: a first input receiving control signal WEN provided by a processor (not shown) and a second input (GND) connected to ground allowing to place a write operation as desired. The address bus (A) of RAM 300 receives address ASP that is provided by a third multiplexer 303 via a bus 313, which multiplexer 303 has two input buses: a first bus receiving general address ADD available on a bus 302 and a second bus connected to the output of an address register 322 also connected to bus 302 and forming the first element of a shift stage for the write cycle. Similarly to multiplexers 217-219-203, multiplexers 317, 319 and 303 are controlled by a control signal ECC FIX for placing a memory rewrite operation when necessary to correct the value recorded at a given address.

A single port memory with 330 is dedicated to storing error correcting codes provided by an encoder circuit 307 (ECC ENCODER) whose input receives the contents of a data register 305 forming, like previously, one of both elements of the pipeline that delays a memory write operation until the next write cycle. Data register 205 receives information DIN32SP carried on bus 318 and transmitted by first multiplexer 317. The output of encoder 207 is transmitted to an input (D) of RAM 330 and to an input of a shifting register 420, whose output is connected to a first input of a multiplexer 340. Memory 330 also comprises an address bus (A) connected to the output of a multiplexer 350 having two inputs. The first input of multiplexer 350 is connected to the output of a shifting register 304 forming the second element of the pipeline allowing to delay ECC code write until the next write cycle. Register 304 has an input connected to ASP address bus 313 that is also connected to a second input of multiplexer 350 and to another shifting register 390 whose output ASP2 is connected to a first input of a comparator 370. Comparator 370 has a second input connected to the output of register 304 and generates a control signal that is transmitted—via a circuit 380—to a control electrode of multiplexer 340.

The control signal WENSP carried on bus 320 is used to control multiplexer 350, register 305 via an interrupt control circuit 410, register 304 via a second interrupt control circuit 400 and input WEN of memory 330. Interrupt control circuits 400 and 410 inhibit data sampling in the corresponding data register.

From the output of memory 330, the correct code is transmitted to a second input of multiplexer 340 and output information—ECC-IN—from this multiplexer is then transmitted to decoder 326, which decoder also receives signal WENSP via a shifting register 430.

Operation of the circuit of FIG. 5 is described hereafter.

During a write cycle i, data is recorded in RAM 300 while encoder 307 computes redundancy bits. The result thus computed is stored in memory 330 within the next write cycle i+1 through the pipeline assembly formed by registers 304 and 305.

In reading mode, data is read in RAMs 300 and 330 within a same cycle. Decoder 326 computes a syndrome and generates a signal ECC-FLAG in the event of an error, which signal is used to inhibit the next read cycle in order to intercalate a correction cycle by rewriting the correct data C-Dout32 in RAM 300. To this end, like previously, a control signal ECC-FIX is transmitted to multiplexers 317, 319 and 303 so that the value corrected by decoder 326 can be rewritten in memory 300.

The conflict situation that exists when trying to access data still awaiting to be written is avoided by means of comparator 370. Indeed, when an address ASP presented on bus 313 matches the previous address—still in standby in register 304—comparator 370 generates a control signal on circuit 380, which control signal then causes multiplexer 340 to switch to register 420 in order to provide the error correcting code value stored in this register. This value is transmitted to decoder 326 to allow the detection of the correct code.

Figure 6:
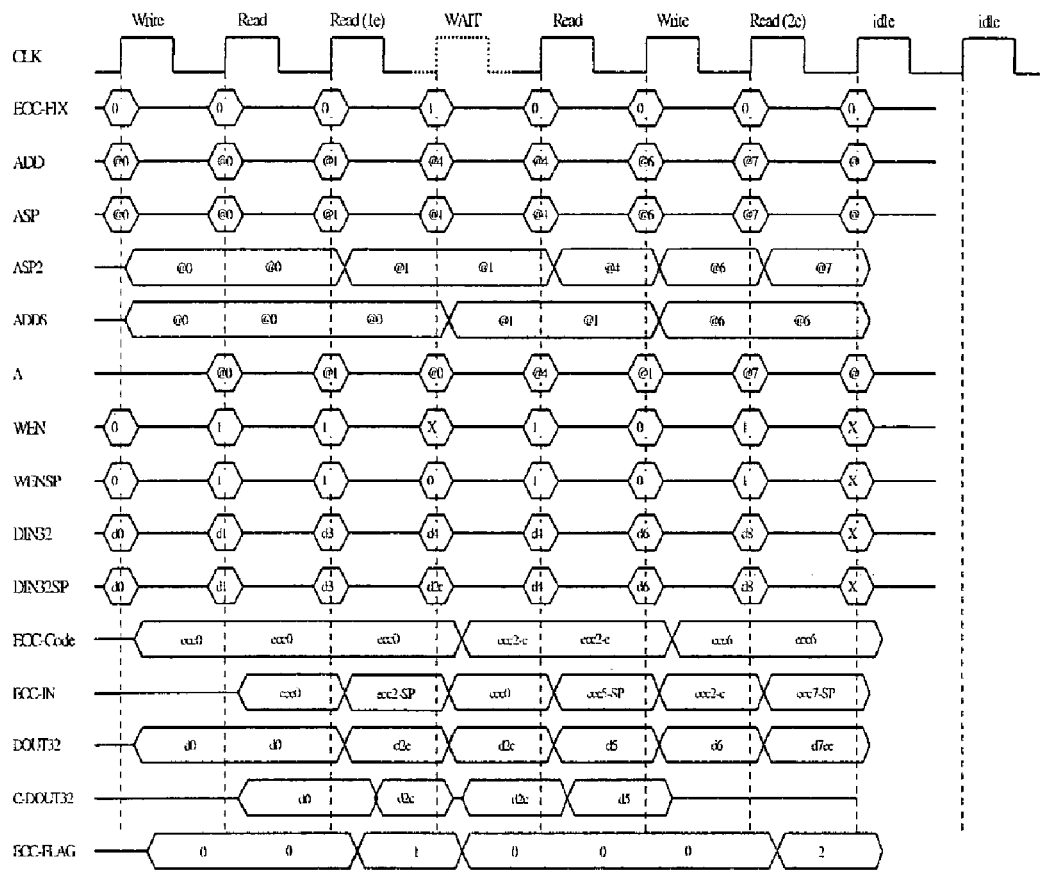
FIG. 6 illustrates chronograms representative of the operation of the third embodiment.

FIG. 6 illustrates chronograms representative of the operation of the circuit of FIG. 5.

As for the circuit in FIG. 2 it can be noted that, again, the error correcting code write is delayed until the next write cycle, which will occur, in some cases, only after one or more read cycles. It is noted that, again, there is enough time for the encoder to compute the error correcting code and thus, greater operating speeds can be easily considered.

Figure 7:
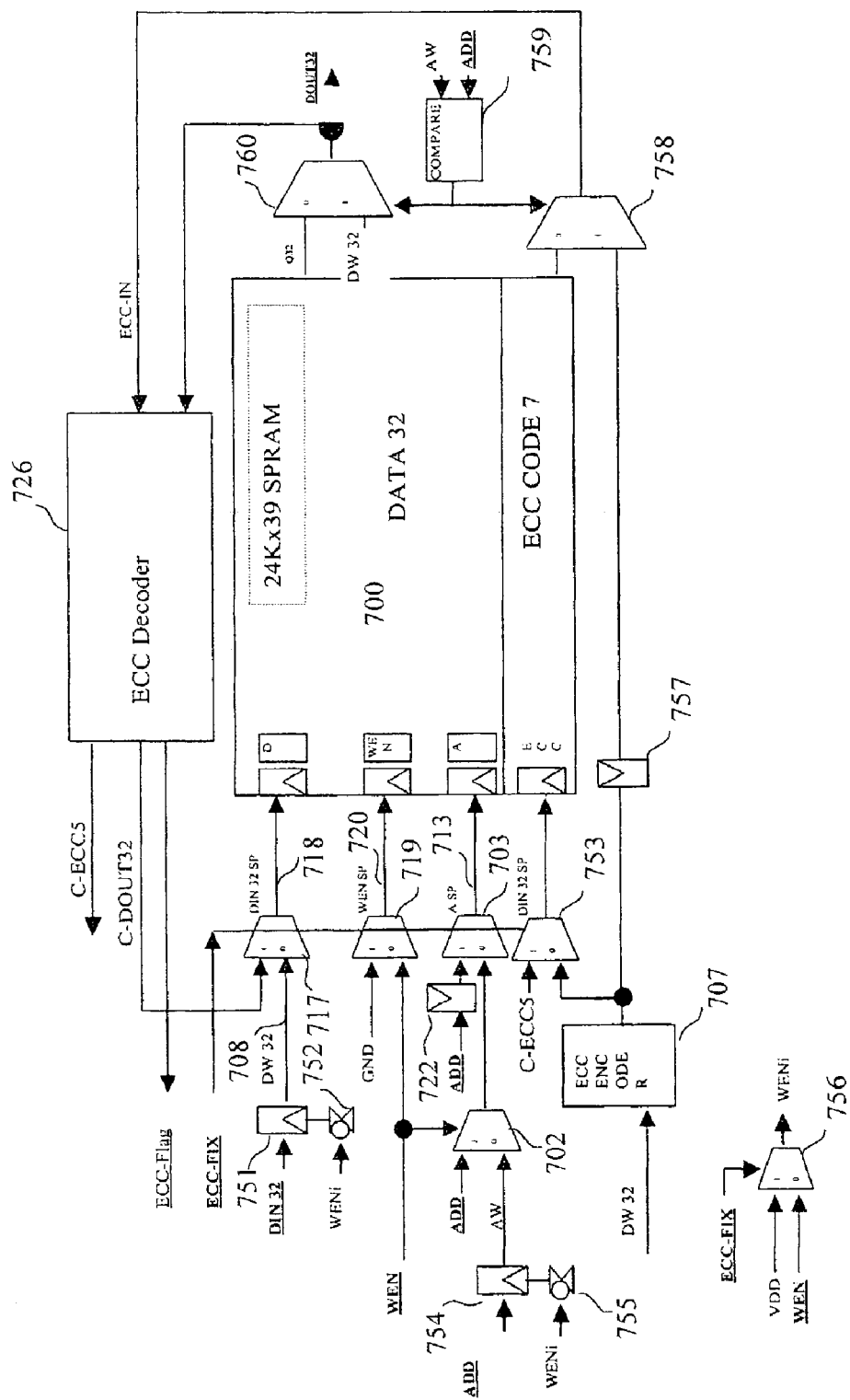
FIG. 7 illustrates a concrete implementation of the first embodiment of the invention.

FIG. 7 more particularly illustrates an embodiment of the invention based on one single port RAM 700 recording data and error correcting codes. RAM 700 has a data bus (D) that receives information DIN32SP from a first multiplexer 717 via a bus 718. Multiplexer 717 has two input buses. A first input receives the contents DW32 of a first pipeline register 751 via a bus 308, which register receives input data to be stored (DIN32) and is controlled by clock interrupt control circuit 752 receiving control signal WENi, while a second input of multiplexer 717 receives information C-Dout32 provided by an BGC-circuit 726 similar to circuit 326 in FIG. 5. As previously, multiplexer 717 allows to deliver the corrected value computed by circuit 726 to an input of memory 700 in order to rewrite the new corrected value when necessary. Control WEN of RAM 700 receives a control signal WENSP transmitted via a circuit 720, which signal is generated by a second multiplexer 719 having two inputs: a first input receiving the control signal WEN provided by a processor (not shown) and a second input (GND) connected to ground for forcing a write operation. Address bus (A) of RAM 700 receives the ASP address that is provided by a third multiplexer 703 via a bus 713, which multiplexer 703 has two input buses: a first bus receiving the output signal of a fourth multiplexer 702 and a second bus connected to the output of an address register 722 receiving address ADD from bus 702 and forming the first element of the shift stage for the write cycle. Fourth multiplexer 702 has a first input receiving address ADD and a second input receiving the contents of a second pipeline register 754 controlled by a clock interrupt control circuit 755 receiving control signal (WENi). As shown, control signal WENi is generated by a multiplexer 756 having a first input receiving supply voltage Vdd and a second input receiving signal WEN. The multiplexer is controlled by an active ECC-Fix signal upon detection of erroneous information in memory 700 that is then corrected.

A fifth multiplexer 753 has a first input receiving the output of encoder 707 and a second input receiving corrected information C-ECC5 output from decoder 726. Fifth multiplexer 753 further has an output that is connected to input ECC of memory 700. The four multiplexers 717, 719, 703 and 753 are controlled by a control signal ECC FIX and make it possible to place a memory rewrite operation when it is necessary to correct the value recorded at a given address.

A comparator 759 compares value ADD of the address bus (at the input of register 754) with the value of the address waiting for a write (at the output of register 754) and provides a control signal to a first and a second multiplexers 758 and 760. Multiplexer 758 has a first input receiving information DW32 stored in register 751 and the output of RAM 700 and, according to the comparator's value, transmits one or the other of these values to the input of decoder 726. This transmitted value is also the output corrected value. Second multiplexer 760 has a first input receiving the error correcting code value read in memory 700 and a second input receiving, via a shifting register 757, the error correcting code computed by encoder 707.

The operation of the circuit of FIG. 7 is as follows.

In reading mode, operation is conventional. Address ADD is transmitted via multiplexers 702 and 703 to the internal address bus of memory 700. It is noted that a light delay due to the presence of both multiplexers 702 and 703 is introduced but that it scarcely affects the operation frequency of the memory circuit. Indeed, it will be observed that the considered delay is about 200 picoseconds, which is much shorter than the 2 nanoseconds necessary for computing an error correcting code.

Data fetched in memory and its associated error correcting code are transmitted via multiplexer 760 towards the memory circuit output (DOUT32). The correct code is also transmitted to decoder 726 that continuously checks for the absence of corruption in the data fetched in memory. In the event of an error, decoder 726 provides corrected data C-DOUT32 as well as a new corresponding correcting code C-ECC5. A control signal ECC-FLAG, also produced by decoder 726 is used to notify the system of the existence of an error and to "steal" a cycle from the processor in order to correct the error. The system (the processor) is then informed that the memory is not ready to provide a value and as a consequence, the output of multiplexer 760 is not validated. During this one-cycle theft, control signal ECC-FIX is used to control multiplexers 717, 719, 703 and 753 to do this correction by causing a memory rewrite. In the next cycle, the memory can then output the corrected value Cdout32.

In writing mode, the value to be stored and its corresponding address are temporarily stored in registers 751 and 754 in order to give encoder 707 time to compute the error correcting code. During the write cycle, the contents of pipeline registers 751 and 754 is presented to memory so that the value written in memory is the previous value, associated with its error correcting code. Encoder 707 will be able to complete computation before the next write cycle.

The conflict situation usually arising from an attempt to access data still awaiting to be written is avoided by means of comparator 759. When both addresses AW and ADD are equal, the comparator controls both multiplexers 758 and 760 so that correct values Dout32 are output.

The present invention is not limited to the examples described above. Many alternative embodiments are possible without departing from the scope defined by the appended claims. For example, it should be obvious to those of ordinary skill in the art that alternative embodiments of the new and novel memory circuit may be implemented in an integrated circuit comprising a circuit supporting substrate that supports at least a portion of the new and novel memory circuit discussed above. Additionally, the new and novel memory circuit may be implemented in a computer system comprising at least one memory circuit electrically coupled to at least one processor thereby providing the advantages of the present invention to such computer system.

While there has been illustrated and described what are presently considered to be the preferred embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A memory circuit having an error correcting system comprising:
   an input address bus;
   an input data bus;
   an output data bus, and
   a memory, electrically coupled to the input address bus, the input data bus, and the output data bus, and having an address bus, a data bus, and an error correcting circuit comprising an encoder, wherein the memory comprises:
   a first register connected to the input address bus for successively storing addresses corresponding to memory write operations only;
   a second register connected to the input data bus for storing data transmitted to the encoder; and
   means for introducing a one-cycle shift into memory write, without modifying memory read.

2. The memory circuit according to claim 1, comprising:
   a single port memory having an address bus, an input data bus, and an output data bus;
   a multiplexer having a first input and a second input, an output and a control electrode, the first input being connected to the input address bus of the memory circuit, the second input being connected to the output of the first register, the output being connected to the address bus of the single port memory and the control electrode receiving a write enable signal.

3. The memory circuit according to claim 2, comprising:
   a comparator having two inputs connected to the input address bus of the memory circuit and to an output of the first register, respectively;
   a second multiplexer having a first input, a second input, an output, and a control electrode;
   the first input of the second multiplexer being connected to the output of the second register;
   the second input of the second multiplexer being connected to the output data bus of the single port memory;
   the output of the second multiplexer being connected to the output data bus of the memory circuit; and
   the control electrode receiving a control signal provided by the comparator.

4. The memory circuit according to claim 1, comprising:
   a first single port memory for storing data and
   a second double port memory for storing error correcting codes, recording of the error correcting codes being delayed until a next write cycle.

5. The memory circuit according to claim 4, comprising:
   an ECC decoder circuit for detecting an error in the first memory; and
   a set of multiplexers for placing a write operation in the first memory within the next cycle, in response to the ECC decoder circuit detecting an error.

6. The memory circuit according to claim 1, comprising:
   a first single port memory for storing data; and
   a second single port memory for storing error correcting codes, recording of the error correcting codes being delayed until the next write cycle.

7. The memory circuit according to claim 6, comprising:
   an ECC decoder circuit for detecting an error in the first single port memory; and
   a set of multiplexers for placing a write operation in the first single port memory within the next cycle, in response to the detection of an error by the ECC decoder circuit.

8. The memory circuit according to claim 1, comprising:
   a synchronous static memory.

9. A memory circuit according to claim 1, comprising:
   at least one of a SEC-DED-type and a DED-TED-type code correcting system.

10. An integrated circuit comprising:
    a circuit supporting substrate; and
    a memory circuit disposed on the circuit supporting substrate, the memory circuit comprising:
    an input address bus;
    an input data bus;
    an output data bus, and a memory, electrically coupled to the input address bus, the input data bus, and the output data bus, and having an address bus, a data bus, and an error correcting circuit comprising an encoder, wherein the memory comprises:
  a first register connected to the input address bus of the memory circuit for successively storing addresses corresponding to memory write operations only;
  a second register connected to the input data bus of the memory circuit for storing data transmitted to the encoder; and
  means for introducing a one-cycle shift into memory write, without modifying memory read.

11. The integrated circuit according to claim 10, comprising:
  a single port memory having an address bus, an input data bus, and an output data bus; and
  a multiplexer having a first input and a second input, an output and a control electrode, the first input being connected to the input address bus of the memory circuit, the second input being connected to the output of the first register, the output being connected to the address bus of the single port memory and the control electrode receiving a write enable signal.

12. The integrated circuit according to claim 11, comprising:
  a comparator having two inputs connected to the input address bus of the memory circuit and to an output of the first register, respectively;
  a second multiplexer having a first input, a second input, an output, and a control electrode;
  the first input of the second multiplexer being connected to the output of the second register;
  the second input of the second multiplexer being connected to the output data bus of the single port memory;
  the output of the second multiplexer being connected to the output data bus of the memory circuit; and
  the control electrode receiving a control signal provided by the comparator.

13. The integrated circuit according to claim 10, comprising:
  a first single port memory for storing data; and
  a second double port memory for storing error correcting codes, recording of the error correcting codes being delayed until a next write cycle.

14. The integrated circuit according to claim 13, comprising:
  an ECC decoder circuit for detecting an error in the first memory; and
  a set of multiplexers for placing a write operation in the first memory within the next cycle, in response to the ECC decoder circuit detecting an error.

15. The integrated circuit according to claim 10, comprising:
  a first single port memory for storing data; and
  a second single port memory for storing error correcting codes, recording of the error correcting codes being delayed until the next write cycle.

16. The integrated circuit according to claim 15, comprising:
  an ECC decoder circuit for detecting an error in the first single port memory; and
  a set of multiplexers for placing a write operation in the first single port memory within the next cycle, in response to the detection of an error by the ECC decoder circuit.

17. The integrated circuit according to claim 10, comprising:
  a synchronous static memory.

18. The integrated circuit according to claim 10, comprising:
  at least one of a SEC-DED-type and a DED-TED-type code correcting system.

19. A computer system comprising:
  at least one processor; and
  at least one integrated circuit communicatively coupled with the at least one processor, each of the at least one integrated circuit comprising:
  a circuit supporting substrate; and
  a memory circuit disposed on the circuit supporting substrate, the memory circuit comprising:
    an input address bus;
    an input data bus;
    an output data bus, and
    a memory, electrically coupled to the input address bus, the input data bus, and the output data bus, and having an address bus, a data bus, and an error correcting circuit comprising an encoder, wherein the memory comprises:
      a first register connected to the input address bus of the memory circuit for successively storing addresses corresponding to memory write operations only;
      a second register connected to the input data bus of the memory circuit for storing data transmitted to the encoder; and
      means for introducing a one-cycle shift into memory write, without modifying memory read.

20. A memory circuit having an error correcting system comprising:
  a first input address bus;
  a first input data bus;
  a first output data bus, and
  a memory, electrically coupled to said first input address bus, said first input data bus, and said first output data bus, and having a second input address bus, a second input data bus, a second output data bus, and an error correcting circuit comprising an encoder, wherein the memory comprises:
    a first register connected to said first input address bus for successively storing addresses corresponding to memory write operations only;
    a first multiplexor having a first input connected to said first input address bus and a second input connected to the output of said first address register, said first multiplexor being controlled by a Write Enable signal and having an output connected to said second address bus;
    a second register connected to said first input data bus for storing data transmitted to the encoder;
    a comparator having a first input connected to said first input address bus and a second input connected to the output of said first register, said comparator generating a control signal when the address stored within said first register is identical to the address currently present on said first address bus; and p2 a second multiplexor having a first input connected to said second output data bus and a second input connected to the output of said second register and an output which is connected to said first output data bus, said second multiplexor being controlled by said control signal generated by said comparator;

whereby said first and second registers, said first and second multiplexor and said encoder are controlled so as to differ the storage of every data to be written within said memory until the next Write operation by means of a temporary storage of said address and data in said first and said second register while the error correcting code is computed by said encoder.

21. An integrated circuit comprising:

a circuit supporting substrate; and a memory circuit disposed on the circuit supporting substrate, the memory circuit comprising:

a first input address bus;

a first input data bus;

a first output data bus, and a memory, electrically coupled to said first input address bus, said first input data bus, and said first output data bus, and having a second input address bus, a second input data bus, a second output data bus, and an error correcting circuit comprising an encoder, wherein the memory comprises:

a first register connected to said first input address bus for successively storing addresses corresponding to memory write operations only;

a first multiplexor having a first input connected to said first input address bus and a second input connected to the output of said first address register, said first multiplexor being controlled by a Write Enable signal and having an output connected to said second address bus;

a second register connected to said first input data bus for storing data transmitted to the encoder;

a comparator having a first input connected to said first input address bus and a second input connected to the output of said first register, said comparator generating a control signal when the address stored within said first register is identical to the address currently present on said first address bus; and a second multiplexor having a first input connected to said second output data bus and a second input connected to the output of said second register and an output which is connected to said first output data bus, said second multiplexor being controlled by said control signal generated by said comparator;

whereby said first and second registers, said first and second multiplexor and said encoder are controlled so as to differ the storage of every data to be written within said memory until the next Write operation by means of a temporary storage of said address and data in said first and said second register while the error correcting code is computed by said encoder.

* * * * *

UNITED STATES PATENT AND TRADEMARK OFFICE
CERTIFICATE OF CORRECTION

PATENT NO. : 7,272,775 B2 Page 1 of 1
APPLICATION NO. : 10/453844
DATED : September 18, 2007
INVENTOR(S) : Francois Jacquet et al.

It is certified that error appears in the above-identified patent and that said Letters Patent is hereby corrected as shown below:

Column 12, line 61, delete -- p2 --

Signed and Sealed this

Twentieth Day of November, 2007

JON W. DUDAS
*Director of the United States Patent and Trademark Office*